United States Patent [19]

Tomita et al.

[11] Patent Number: 4,525,151
[45] Date of Patent: Jun. 25, 1985

[54] TIMING ADJUSTMENT MECHANISM IN WRAPPING CONNECTOR DRIVING DEVICE

[75] Inventors: Tsutomu Tomita, Okazaki; Kimihide Horio; Tadahisa Naganawa, both of Toyota, all of Japan

[73] Assignee: Toyota Jidosha Kabushiki Kaisha, Toyota, Japan

[21] Appl. No.: 433,280

[22] Filed: Oct. 7, 1982

[30] Foreign Application Priority Data

Mar. 8, 1982 [JP] Japan .................................. 57-36173

[51] Int. Cl.³ ............................................ F16H 7/08
[52] U.S. Cl. .................... 474/101; 474/134; 123/90.15
[58] Field of Search ............... 474/101, 118, 133, 134, 474/136, 137, 139, 149, 900; 123/90.15, 90.16, 90.17

[56] References Cited

U.S. PATENT DOCUMENTS

| | | | |
|---|---|---|---|
| 2,683,993 | 7/1954 | Covert | 474/900 |
| 3,166,947 | 1/1965 | Hendershot | 474/900 |
| 3,441,009 | 4/1969 | Rafanelli | 123/90.15 |
| 3,888,217 | 6/1975 | Hisserich | 474/137 |
| 4,302,985 | 12/1981 | Natkin | 474/900 |
| 4,416,647 | 11/1983 | White, Jr. | 474/134 |

Primary Examiner—Stephen J. Novosad
Assistant Examiner—Thuy M. Bui
Attorney, Agent, or Firm—Kenyon & Kenyon

[57] ABSTRACT

A timing adjustment mechanism in a wrapping connector driving device includes a first pulley fixedly mounted on a first revolving shaft; a second pulley fixedly mounted on a second revolving shaft, the second pulley tightly fitting on the second shaft and being seated on an end surface of the second shaft; an intermediary wrapping connector wound on the first and second pulleys and extending therebetween; an idle pulley lever swingable about the axis of rotation of the second revolving shaft; a first idle pulley disposed near the second pulley on the tension side of the intermediary wrapping connector and rotatably secured to one end of said pulley holding lever; and an idle pulley rotatably secured to the other end of said pulley holding lever near said second pulley on the slack side of said intermediary wrapping connector, wherein all of the central portions of swing of the first and second pulleys, the tension and slack side pulleys and the pulley holding lever lie in the same plane.

11 Claims, 2 Drawing Figures

TIMING ADJUSTMENT MECHANISM IN WRAPPING CONNECTOR DRIVING DEVICE

BACKGROUND OF THE INVENTION

The present invention relates to a mechanism which adjusts the timing between first and second revolving shafts in a wrapping connector driving device.

In a wrapping connector driving device where a driving shaft rotates a driven shaft via an intermediary wrapping connector, such as a timing belt, a chain or the like, not only transmission of motive power but also capability of establishing a predetermined timing between the driving shaft and driven shaft, that is, setting of rotary position of the driven shaft with respect to rotary position of the driving shaft, is sometimes required. If this interlocking timing can be varied within a certain range, then useful characteristics may be provided. For example, by varying the timing between a cam shaft for inlet or outlet valve and a crankshaft according to the running conditions, output performance and fuel consumption may be improved.

SUMMARY OF THE INVENTION

In view of the foregoing, it is an object of the present invention to provide a timing adjustment mechanism which permits easy adjustment of timing between driving and driven shafts by means of a simple mechanism.

It is another object of the present invention to provide a timing adjustment mechanism which avoids undue bending moment on the mechanism caused by tension in an intermediary wrapping connector.

It is a further object of the present invention to provide a timing adjustment mechanism which permits winding of an intermediary wrapping connector on a pulley close to the mechanism, while the pulley is simply placed on a revolving shaft, that is, prior to firm attachment of the pulley to the shaft, thus increasing the degree of freedom in assembly operation procedures.

These objects are attained in accordance with the principles of the present invention by providing in connection with parallel driving and driven shafts an idle pulley lever which is adapted to swing about the axis of rotation of one revolving shaft interlocked with the other revolving shaft via an intermediary wrapping connector, the idle pulley having one of a pair of idle pulleys disposed on the tension sides of the connector near a pulley fixedly mounted on said one revolving shaft and the other idle pulley disposed on the slack side of the connector. This causes the one idle pulley on the tension side, as an example, to reduce the deflection of the tension side of the intermediary wrapping connector if the idle pulley lever pivots to one side, while causing the other idle pulley on the slack side to increase the deflection of the slack side of the connector. As a result, the wrapping connector is partially displaced toward the tension side by a distance corresponding to the degree of lever movement, thereby rotating one revolving shaft slightly with respect to the other revolving shaft. Accordingly, any desired timing between driving and driven shafts can be established by appropriately selecting the direction and amplitude of rotation of the idle pulley lever.

Further, in accordance with an aspect of the present invention, the pivot bearing of the idle pulley lever is disposed in a plane in which both idle pulleys and the pulleys each fixedly mounted on the respective one of a pair of revolving shafts all lie, that is, the plane defined by the intermediary wrapping connector. Thus even if the idle pulley lever is subject to an external force from the intermediary wrapping connector via both idle pulleys, this external force will not produce a bending moment on the pivot bearing of the idle pulley lever. Therefore, the pivot bearing of the lever can have a simple construction since it receives only the force perpendicular to the pivot axis.

In accordance with another aspect of the present invention, a pulley which is be fixedly mounted on the one revolving shaft is designed to fit tightly on the end of said one revolving shaft and to seat on one end surface of the shaft for assembly purposes prior to being fixed thereon. This permits the pulley to be stably held on the one revolving shaft in opposition to the tension in this intermediary wrapping connector when the wrapping connector is wound on the pulley after only placing the pulley on the one revolving shaft, that is, in advance of securing of the pulley, as in connection with procedures for assembly operations. The aforementioned idle pulley lever is driven toward and held in a desired angular position by means of an appropriate driving mechanism.

These and other objects and features of the present invention will be apparent upon the reading of the description of the invention in conjunction with the attached drawings, with the understanding that such variations and modifications as fall within the scope of the appended claims will be easily made by the skilled in the art without departing from the spirit of the invention.

BRIEF DESCRIPTION OF THE DRAWINGS

FIG. 2 is a sectional view taken at line II—II in FIG 1.

DETAILED DESCRIPTION OF THE INVENTION

Figure 1:
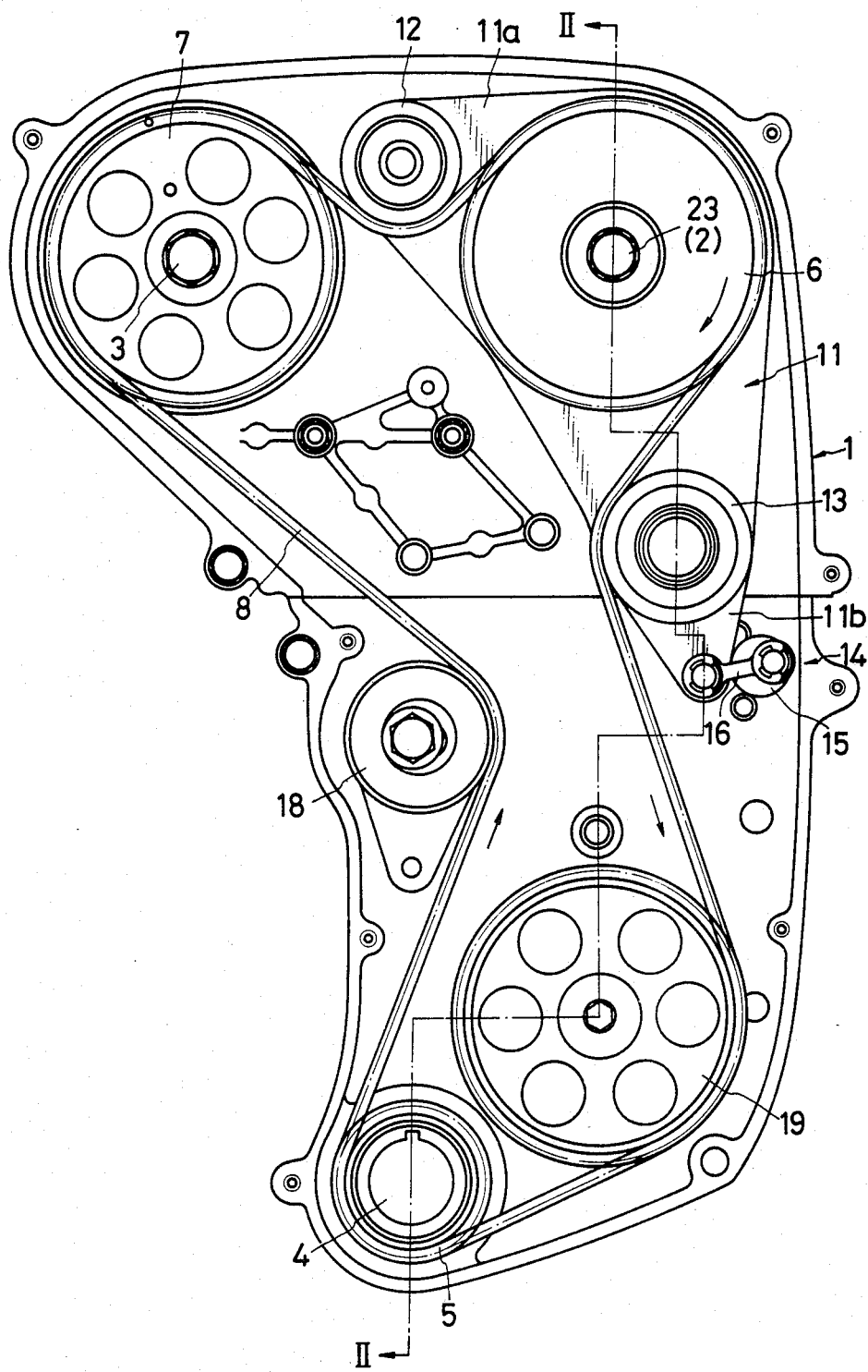
FIG. 1 is a front elevation of one embodiment of the present invention.

The present invention will be hereinafter described in detail in connection with an embodiment of an inlet and outlet valve driving mechanism of a reciprocating engine, taken in conjunction of the accompanying drawings.

Referring to the drawings, there is shown a body of an engine 1 having double overhead cam shafts (customarily called "DOHC"), i.e., a cam shaft 2 for actuating an inlet valve and a cam shaft 3 for actuating an outlet valve, these valves being independent of each other. A pulley 5 is fixedly mounted on a crankshaft 4 in the body 1, while pulleys 6 and 7 are fixedly mounted on the respective cam shafts 2 and 3. A timing belt 8 as a wrapping connector is wound on the pulleys 5, 6 and 7 and extends therebetween to rotate and drive the cam shafts 2 and 3 by means of the crankshaft 4. In the embodiment described, the crankshaft 4 is rotated in the clockwise direction as viewed in FIG. 1 and, therefore, the tension side of the timing belt 8 with respect to camshaft 2 lies between the pulley 5 (crankshaft 4) and the pulley 6, and the slack side with respect to camshaft 2 extends from the pulley 6 to the pulley 7 (cam shaft 3). Both cam shafts 2 and 3 are rotatably supported in a cam housing 9, on which an idle pulley lever 11 is swingably mounted via a bearing 10. The lever swings with respect to the axis of rotation of the cam shaft 2 and has one end 11a on which a slack side pulley 12 is rotatably mounted to deflect the timing belt 8 between the cam shafts 2 and 3. A tension side idle pulley 13 is rotatably mounted on the other end 11b of the lever 11 to deflect the belt 8 between the crankshaft 4 and the cam shaft 2.

A drive mechanism 14 causes the pulley lever 11 to swing toward and be held in a desired angular position. In this embodiment, the drive mechanism 14 has a shaft 15 rotatably mounted in a cylinder block or the like of the body of engine 1 and a connecting rod 16 that is eccentrically and rotatably connected to the end of shaft 15 and to the end 11b of the idle pulley lever 11 to adjust the angular position of the lever according to the rotational position of the shaft 15, which in turn is rotated to an arbitrary angle by means of a rotating device (not shown).

There are also shown a tension pulley 18, a pulley 19 for auxiliary machinery, such as an oil pump, incorporated in the body of engine, and a pulley 20 for auxiliary machinery, such as an alternator, installed outside the engine. Of these elements, the pulleys 18 and 19 and aforesaid pulleys 5, 6, 7, 12 and 13 and idle pulley lever 11 are covered with a front cover 21 attached to the body of engine.

The pulleys 5, 6, 7, 12, 13, 18 and 19 as well as the timing belt 8 are all disposed in a plane F (see FIG. 2), and the pivot portion of the idle pulley lever 11, that is, the portion mounted on the bearing 10, also lies in the plane F. Specifically, the pulley 6 comprises a front plate 6a, an outer cylinder 6b which extends rearwardly (to the right in FIG. 2) from the outer edge of the front plate 6a to engage the timing belt 8, an inner cylinder 6a extending rearwardly from the inner edge of the front plate 6a, and a rear plate 6d which extends radially inwardly from the rear end surface of the inner cylinder 6c and is provided with a central bore 6e for tight engagement with the camshaft 2. Thus an annular space 22 is formed between the outer cylinder 6b and inner cylinder 6c on the rear side of the front plate 6a, and a cylindrical rib 9a of said cam housing 9 protrudes into the annular space 22. Mounted on the outer periphery of the protruding rib 9a is a bearing 10.

The idle pulley lever 11 has an inner cylindrical portion 11c which extends frontward coaxially with its pivot axis and fits tightly into the bearing 10 within the annular space 22. In this manner, the pivot portion, that is, the inner cylindrical portion 11c and the bearing 10, are disposed in the plane F.

The pulley 6 as described above is secured to the cam shaft 2 by means of a bolt 23. More specifically, the front end surface of the cam shaft 2 (the leftmost surface in FIG. 2) is provided with a protrusion 2a of a reduced radius, and this protrusion fits tightly into the central bore 6e in the pulley 6. The rear plate 6d of the pulley 6 is seated on a stepped surface 2c formed between the protrusion 2a and a portion 2b. By screwing the bolt 23 into a screw hole 2d extending coaxially into the cam shaft 2 via a washer 24, the pulley 6 is secured to the cam shaft 2 while being located axially by the stepped surface 2c of the cam shaft 2. When necessary, relative rotation between the pulley 6 and the cam shaft 2 is prevented by inserting a knock pin into a small hole extending through both rear plate 6d of the pulley 6 and the end surface of the cam shaft 2.

In the operation of the structure described above, it is now assumed that the cam shaft 2 should be rotated slightly clockwise in FIG. 1, that is, the phase of cam shaft 2 should be advanced with respect to the crankshaft 4. To accomplish this, the drive mechanism 14 swings the idle pulley lever 11 in the clockwise direction in FIG. 1 to cause the idle pulley 13 on the tension side to increase the deflection of the timing belt 8 and at the same time to cause the idle pulley 12 on the slack side to decrease the deflection of the belt 8. The result is that the portion of the timing belt 8 between the idle pulleys 12 and 13, displaced toward the tension side, thereby slightly rotating the pulley 6 and the cam shaft 2 in the clockwise direction in FIG. 1.

In order to rotate the cam shaft 2 in a counterclockwise direction in FIG. 1 with respect to the crankshaft 4, the above procedures may be similarly used except that the pulley holding lever 11 is swung in the counterclockwise direction in FIG. 1.

When the timing belt 8 is wound on the pulley 6 before securing the pulley 6 to the cam shaft 2 by means of the bolt 23, the pulley 6 will keep its stabilized posture with respect to the cam shaft 2, even if it receives tension from the timing belt 8, and it will assure that the pulley 6 is prevented from falling off the cam shaft 2 until the pulley is secured with the bolt 23. This is due to the fact that the protrusion 2a of reduced radius fits tightly into the central bore 6e the, and the rear plate 6d of the pulley 6 is seated on the stepped surface 2c of the cam shaft 2.

Figure 2:
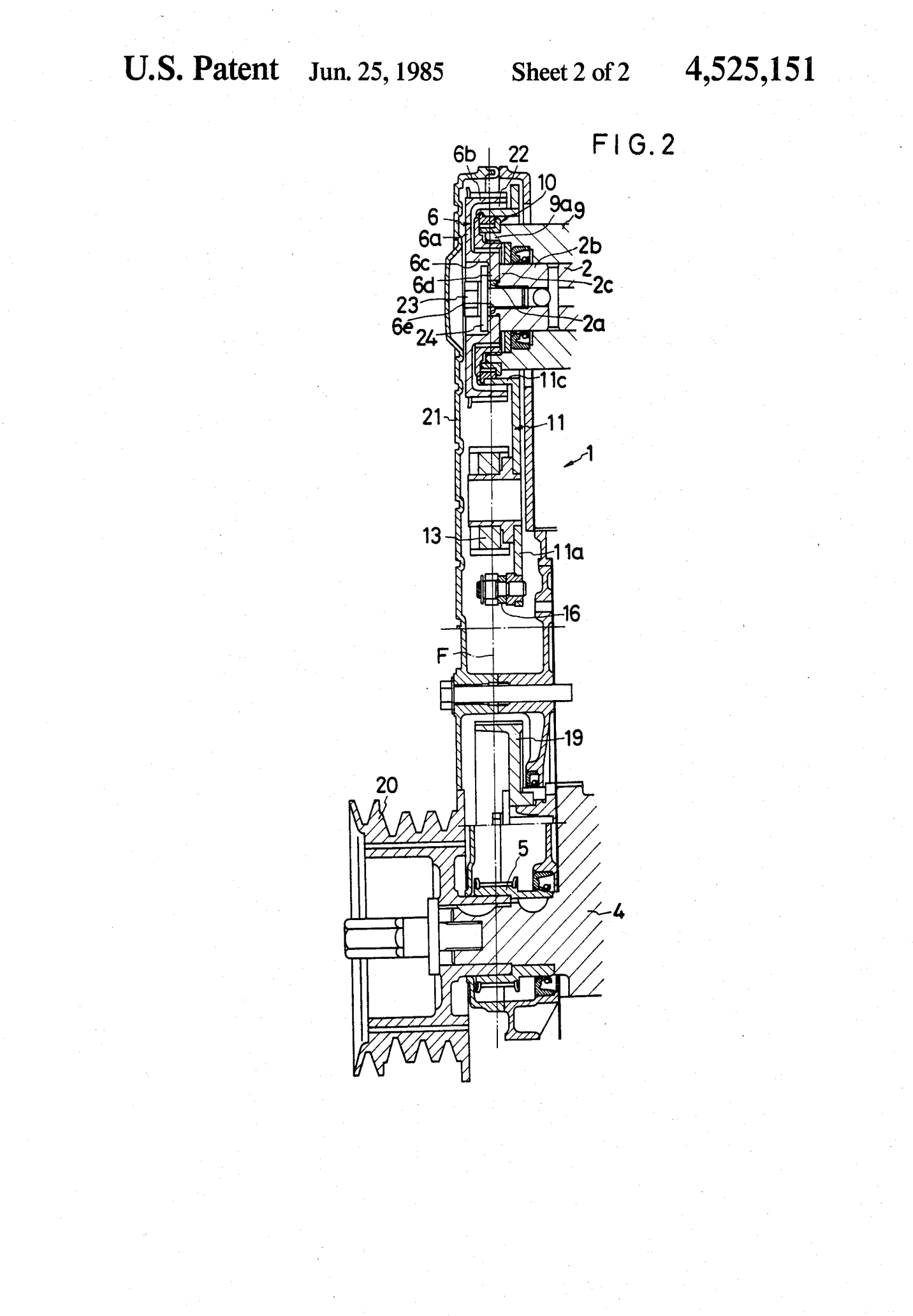

At that time the support bearing 10 for the idle pulley lever 11 will receive a reaction force corresponding to the tension in the timing belt 8 via the idle pulleys 12 and 13, but it will not be subjected to any unwanted bending moment which results from such a reaction force and tends to swing the lever in clockwise or counterclockwise direction in FIG. 2, because the bearing 10 and the pivot portion of the lever (the inner cylinder 11c) lie in the plane of the timing belt 8. Therefore, the idle pulley lever 11 can keep holding the idle pulleys 12 and 13 in a certain ever-stable posture over long term service.

In addition to the embodiment described hereinbefore, the present invention can be embodied, for example, as follows:

(1) The present invention is also applicable to a single cam shaft which drives inlet and outlet valves in a so-called "SOCH" system.

(2) The present invention is further applicable to a system having a pair of revolving shafts which are interlocked with each other via an intermediary wrapping connector besides crankshaft and a camshaft for inlet and outlet valves in an internal combustion engine.

(3) The drive mechanism 14 can be replaced by any other device which can drive the idle pulley lever 11 toward a desired swing position and hold the lever there.

(4) Each of the pulleys 5, 6 and 7 is a toothed pulley in the embodiment above, as the timing belt 8 is used as an intermediary wrapping connector. However, if a chain is used as an intermediary wrapping connector, then the pulleys 5, 6 and 7 can each take an appropriate form such as a sprocket, according to the nature of the intermediary wrapping connector.

(5) The idle pulley lever 11 is mounted on the cam shaft 2 which acts as a driven shaft having a load lighter than that of the crankshaft, which in turn acts as a drive shaft in the above embodiment. In other words, the external force required to rotate the cam shaft is relatively small. However, the idle pulley lever 11 may be mounted on the drive shaft, taking the magnitudes of the loads, the occupied space, and other factors into consideration.

(6) The cam shaft 2 may be provided with a hole, whereas the pulley 6 may be provided with a protrusion tightly fitting into the hole so that they may axially engage with each other.

It may be understood from the foregoing that the present invention enables easy adjustment of timing owing to its relatively simple structure. Especially, no bending moment results from the reaction force from the intermediary wrapping connector to produce backlash of the idle pulley lever, thus both idle pulleys are maintained in fixed relation without any backlash.

Furthermore, the intermediary wrapping connector can be wound on the pulley after the pulley has been only placed on the shaft, without final securing, resulting in increase of the degree of freedom in assembly operation procedures.

Having thus described the invention, what is claimed as novel and described to be sought by the Letters Patent is:

1. A multi-shaft endless connector driving device having a timing adjustment mechanism, the device comprising:
   first and second rotatable shafts;
   a first drive pulley fixedly mounted on the first rotatable shaft;
   a second drive pulley fixedly mounted on the second rotatable shaft, said second pulley fitting tightly on the shaft and being seated on an end surface of said shaft;
   an endless non-slip connector trained around said first and second pulleys for transmitting a driving force between said pulleys; and
   a timing adjustment mechanism for adjusting the angular relation between the first and second rotatable shafts, the timing adjustment mechanism including:
   an idle pulley lever;
   bearing means supporting the idle pulley lever for pivoting motion about the axis of rotation of said second rotatable shaft;
   a first idle pulley rotatably secured to the idle pulley lever and contacting the endless connector on one side of, and adjacent to, the second drive pulley;
   a second idle pulley rotatably secured to the idle pulley lever and contacting the endless connector on the other side of, and adjacent to, the second drive pulley; and
   means for pivoting and holding the idle pulley lever within a predetermined angular range for adjusting the angular relation between the first and second rotatable shafts, wherein
   said bearing means supporting the idle pulley lever for pivoting motion about the axis of rotation of the second shaft is coplanar with the second drive pulley and the first and second idle pulleys, whereby the resultant of tension forces in the endless connector acting on the first and second idle pulleys exerts no bending moment on said bearing means.

2. A driving device according to claim 1 wherein the means for pivoting and holding the idle pulley lever comprises a third rotatable shaft parallel to the second rotatable shaft and a connecting rod having one end pivotally connected to the idle pulley lever at a location offset from the axis of rotation of the second drive shaft and another end pivotally connected to the third rotatable shaft at a location offset from the axis of rotation of said third shaft.

3. A driving device according to claim 1 or 2 wherein the first rotatable shaft is a driving shaft and the second rotatable shaft is a driven shaft.

4. A driving device according to claim 3 wherein the non-slip endless connector is a timing belt, and the first and second drive pulleys and the first and second idle pulleys comprise gears meshing with the timing belt.

5. A driving device according to claim 1 or 2 wherein the non-slip endless connector is a timing belt, and the first and second drive pulleys and the first and second idle pulleys comprise gears meshing with the timing belt.

6. A driving device according to claim 5 adapted for use on an internal combustion engine, wherein the first rotatable shaft is a crankshaft, the first drive pulley is a crank pulley, and the second rotatable shaft is a camshaft.

7. A driving device according to claim 6 wherein the camshaft operates at least one intake valve.

8. A driving device according to claim 7, the device further comprising a fourth rotatable shaft parallel to the second rotatable shaft and a third drive pulley fixedly mounted on the fourth rotatable shaft and coplanar with the second drive pulley, and the endless connector being trained around the third drive pulley between one of the idle pulleys and the crank pulley, and the fourth rotatable shaft being adaptable to operate at least one exhaust valve.

9. A driving device according to claim 1 or 2 adapted for use on an internal combustion engine, wherein the first rotatable shaft is a crankshaft, the first drive pulley is a crank pulley, and the second rotatable shaft is a camshaft.

10. A driving device according to claim 9 wherein the camshaft operates at least one intake valve.

11. A driving device according to claim 10, the device further comprising a fourth rotatable shaft parallel to the second rotatable shaft and a third drive pulley fixedly mounted on the fourth rotatable shaft and coplanar with the second drive pulley, the endless connector being trained around the third drive pulley between one of the idle pulleys and the crank pulley, and the fourth rotatable shaft being adapted to operate at least one exhaust valve.

* * * * *

UNITED STATES PATENT AND TRADEMARK OFFICE
CERTIFICATE OF CORRECTION

PATENT NO. : 4,525,151

DATED : June 25, 1985

INVENTOR(S) : T. Tomita et al

It is certified that error appears in the above-identified patent and that said Letters Patent is hereby corrected as shown below:

Column 1, line 47, "sides" should read -- side --.

Column 3, line 31, after "cylinder" "6a" should read -- 6c --.

Column 4, line 23, after "6e" delete "the".

Column 4, line 43, "SOCH" should read -- SOHC --.

Signed and Sealed this

Twenty-fourth Day of December 1985

[SEAL]

Attest:

DONALD J. QUIGG

Attesting Officer

Commissioner of Patents and Trademarks